United States Patent
Oloman et al.

(10) Patent No.: US 7,306,711 B2
(45) Date of Patent: Dec. 11, 2007

(54) ELECTROLYTIC GENERATION OF NITROGEN USING AZOLE DERIVATIVES

(76) Inventors: Colin Oloman, 3176 W. 36th Avenue, Vancouver, B.C. (CA) V6N 2R5; Diana Lencar, #305-1234, W. 14th Avenue, Vancouver, B.C. (CA) V6H 1P9

(*) Notice: Subject to any disclaimer, the term of this patent is extended or adjusted under 35 U.S.C. 154(b) by 700 days.

(21) Appl. No.: 10/869,791

(22) Filed: Jun. 15, 2004

(65) Prior Publication Data

US 2004/0232003 A1 Nov. 25, 2004

Related U.S. Application Data

(63) Continuation of application No. 10/061,754, filed on Feb. 1, 2002, now Pat. No. 6,835,298.

(51) Int. Cl.
*C25B 1/00* (2006.01)
*C02F 101/38* (2006.01)
*C02F 1/461* (2006.01)
*C25B 9/00* (2006.01)

(52) U.S. Cl. .................. 205/617; 205/688; 205/742; 210/748

(58) Field of Classification Search .......... 205/617
See application file for complete search history.

(56) References Cited

U.S. PATENT DOCUMENTS

| | | | |
|---|---|---|---|
| 5,423,454 A | 6/1995 | Lippman et al. | |
| 5,567,287 A | 10/1996 | Joshi et al. | |
| 5,580,681 A | 12/1996 | Fleischer | |
| 5,728,487 A | 3/1998 | Gratzel et al. | |
| 5,731,105 A | 3/1998 | Fleischer et al. | |
| 5,882,819 A | 3/1999 | Naoi et al. | |
| 6,299,743 B1 | 10/2001 | Oloman et al. | |
| 6,939,458 B1* | 9/2005 | Nishimura et al. | 205/742 |

OTHER PUBLICATIONS

Sahin, M. et al., "The Inhibition effects of some cyclic nitrogen compounds on the corrosion of the steel in NaCl mediums", *Applied Surface Science*, vol. 195, No. 1-4, Jul. 15, 2002, pp. 1-7.

\* cited by examiner

*Primary Examiner*—Harry D Wilkins, III
(74) *Attorney, Agent, or Firm*—Jeffrey J. King

(57) ABSTRACT

The invention provides electrolytes for the electrochemical generation of nitrogen gas by anodic oxidation of triazole and tetrazole derivatives. Electrolytic cells incorporating these electrolytes are also disclosed. The nitrogen gas so produced may be useful to actuate mechanical transducers in fluid dispensers.

36 Claims, 1 Drawing Sheet

ELECTROLYTIC GENERATION OF NITROGEN USING AZOLE DERIVATIVES

CROSS REFERENCE TO RELATED APPLICATION

This application is a continuation of U.S. patent application Ser. No. 10/061,754 filed Feb. 1, 2002 now U.S Pat. No. 6,835,298. The subject priority disclosure is incorporated herein by reference.

FIELD OF INVENTION

The invention is in the field of methods for electrochemical generation of gases. More particularly this invention relates to the generation of nitrogen gas from triazole and tetrazole derivatives, and mechanical transducers actuated by the nitrogen gas so produced, particularly in the field of fluid dispensers.

BACKGROUND OF THE INVENTION

The controlled electrolytic generation of gases is useful to convert chemical to mechanical energy in a variety of applications. For example, a variety of lubricant or fluid delivery systems driven by the electrolytic generation of a gas are known. For example, U.S. Pat. No. 4,023,648 to Orlitzky et al. (1977) shows a lubricant applicator driven by gas generated in an electrochemical cell and provides a method for the electrochemical generation of hydrogen gas.

Fluid dispensers driven by electrochemically generated gases, and other electrochemical transducers may often be used in circumstances which give rise to special operational requirements. Typically, components of any electrolytic cell used in such an application must be stable over time and over a range of temperatures. In such devices, it may be undesirable to have highly reactive gases generated, such as hydrogen or oxygen. Once the circuits are closed to initiate electrolytic gas generation, it is generally desirable to have relatively fast electrode reactions with low overpotential (i.e. a small difference between the electrode potential under electrolysis conditions and the thermodynamic value of the electrode potential in the absence of electrolysis), small concentration polarisation of solutes across the cell (i.e. rapid diffusion of reactants to the electrode surfaces.), and small separator resistance effects (i.e. little resistance caused by solid separators within the cell. It is also desirable to produce gases from a small amount of material, i.e. to have efficient gas generation and high stoichiometric coefficients for gaseous reaction products.

The electrochemical generation of a gas can be represented by equation (1):

$$aR+/-ne^- \rightarrow bG+cP$$

where R, G and P represent the reactant, the gas product, and the non-gas product respectively; and a, b, c, and n are the stoichiometric coefficients. When utilizing an electrical circuit to drive the current through the electrochemical cell it is desirable to produce gas in an efficient manner from a viewpoint of electric charge consumption. Such efficiency requires a high gas product stoichiometric coefficient associated with a low electron stoichiometric coefficient. A stoichiometric efficiency of gas generation (E) in moles per Faraday may be defined in equation (1) as:

$$E=b/n \text{ mol}/F$$

Hydrogen and oxygen gases are used in a variety of known electrochemical gas generators. For example the anodic oxidation and cathodic reduction of water respectively generate oxygen and hydrogen by the reactions 1 and 2:

Anodic oxidation of $H_2O$: $2H_2O-4e^- \rightarrow O_2+4H^+$     reaction 1

Cathodic reduction of $H_2O$: $2H_2O+2e^- \rightarrow H_2+2OH^-$     reaction 2

The anodic oxidation of water has a low stoichiometry efficiency for gas production (0.25 mole of oxygen gas per Faraday). A low stoichiometry efficiency may be undesirable because the quantities of reactant and current needed to produced the desired amount of gas may require a large volume of the unit and a high capacity energy source. Another disadvantage of oxygen is that it may pose safety problems when utilized for dispensing combustible fluids such as grease.

The cathodic reduction of water has a better stoichiometric efficiency for gas production (0.50 mole of hydrogen gas per Faraday) but the production of hydrogen gas is hazardous due to its explosive reactivity with oxygen upon ignition. Another disadvantage of hydrogen is that it diffuses relatively rapidly through a variety of polymeric barriers that might otherwise be used to contain the electrolytically generated gas in a mechanical transducer, such as a fluid dispenser.

Nitrogen is a relatively inert gas that may usefully be produced by electrolytic reactions to provide controlled amounts of gas. U.S. Pat. No. 5,567,287 issued to Joshi et al. (1996) discloses a solid state electrochemical nitrogen gas generator for fluid dispensing applications wherein nitrogen is produced by electro-oxidation of alkali metal nitrides or azides. The azide half-cell reaction in that system produces non-reactive nitrogen with a stoichiometry efficiency of 1.5 moles of nitrogen gas per Faraday (reaction 3).

$2N_3^- \square 3N_2+2e^-$     reaction 3

Based on reaction 3, a fluid dispenser operating at 0.25 mA has the potential to generate about 0.33 ml STP of gas per hour for up to 4000 hours from a battery with capacity of 1 A.h. With sodium azide as the anode reactant, 1 liter STP of nitrogen gas could be generated from about 2 grams of $NaN_3$.

The azide half-cell reaction in such a system may however be slow, in part because of the high overpotential required for the electro-oxidation of azide. To overcome the problem of the sluggish kinetics of the azide half-cell, additives such as thiocyanate may be used to catalyse iodine mediated formation of nitrogen from azides. However, such systems suffer from the disadvantages that azides are toxic and the thiocyanate salt catalysts are also toxic. The presence of toxic compounds may make it difficult to dispose of a device which generates nitrogen gas from azides.

U.S. Pat. No. 6,299,743 to Oloman et al. (2001) discloses the electrochemical generation of nitrogen gas from organic nitrogen compounds, such as hydrazides ($RCONHNH_2$), the corresponding organic hydrazino-carboxylates ($RCO_2NHNH_2$) and amino-guanidine salts (e.g. aminoguanide bicarbonate $H_2NNHC(NH)NH_2.H_2CO_3$). For example, the electro-oxidation of methyl hydrazinocarboxylate generates nitrogen gas with a stoichiometric efficiency of 0.5 moles per Faraday according to the putative reaction 4:

$CH_3CO_2NHNH_2 \rightarrow CH_3CO_2H+N_2+2H^++2e^-$     reaction 4

Based on reaction 4 an electrical source with a current of at least 0.75 mA would be required to generate 0.33 ml STP/hour of nitrogen and a mass of 4 gram of methyl hydrazino-carboxylate would be needed to produce 1 liter STP of the gas.

Compounds having a high nitrogen content such as triazoles and tetrazoles have been investigated as non-azide nitrogen gas generant components in pyrotechnic compositions that may be useful as propellants or for inflating aircraft or automobile safety crash bags. Clearly, the explosive release of gases is not desirable in controlled electrolytic gas generators.

SUMMARY OF THE INVENTION

In one aspect, the invention provides electrolytes for the electrochemical generation of nitrogen gas by anodic oxidation of azole derivatives having a high nitrogen content. A high nitrogen content azole compound or derivative refers, in some embodiments, to a five-membered N-heterocycle containing two double bonds and having at least three nitrogen ring atoms. In alternative embodiments, the high nitrogen content azole derivatives of the invention may include triazoles, aminotriazoles, tetrazoles, aminotetrazoles and their salts. A variety of triazoles and tetrazoles may be used and empirically tested for performance in alternative embodiments.

The triazoles may include, for example, the 1H- and 2H-1,2,3-triazole tautomers, the 1H- and 4H-1,2,4-triazole tautomers, and their mono-, di- or trisubstituted derivatives. The mono-, di-, and trisubstituted derivatives may include, for example, suitable alkyl, alkenyl, alkynyl, arylalkyl or aryl groups. The alkyl, alkenyl, and alkynyl groups may be linear or branched, substituted or unsubstituted. In some embodiments, the mono-, di-, and trisubstitued derivatives may include lower alkyl, lower aryl and arylalkyl groups. Lower alkyl and lower arylalkyl groups denote alkyl groups and alkyl moiety in arylalkyl groups having up to and including 4 carbon atoms. Lower alkyls may, for example, include, methyl, ethyl, propyl, isopropyl, butyl, isobutyl, secondary butyl or tertiary butyl. Lower arylalkyl may include, for example, benzyl. Aryl groups, for example, may include phenyl and phenyl substituted by up to and including 3 lower alkyl groups as defined above.

The aminotriazoles may include, for example, 1-amino-1H-1,2,3-triazole, 2-amino-2H-1,2,3-triazole, 4amino-1H or 2H-1,2,3-triazole, 5-amino-IH-1,2,3-triazole, 3-amino-1H or 4H-1,2,4-triazole, 4-amino-4H-1,2,4-triazole and 5-amino-1H-1,2,4-triazole and their mono-, di-, tri and tetrasubstituted derivatives. Mono-, di-, tri- and tetrasubstituted aminotriazoles may include, for example, alkyl, alkenyl, alkynyls, aryl or arylalkyl groups. In some embodiments the mono-, di- tri- and tetrasubstituted aminotriazoles may include lower alkyl, lower arylalkyl and aryl groups, wherein the lower alkyl and lower arylalkyl and aryl groups are defined as previously. Monosubstituted aminotriazoles may include species substituted at the triazole ring and compounds substituted at the amino group. Disubstituted aminotriazoles may include compounds substituted at the triazole ring and amino group, compounds disubstituted at the triazole ring and compounds disubstituted at the amino group. Trisubstituted aminotriazoles may include species disubstituted at the triazole ring and monosubstituted at the amino group and compounds monosubstituted at the triazole ring and disubstituted at the amino group.

The tetrazoles may include, for example, the 1H- and 2H-tautomers and their mono- or disubstituted derivatives. Monosubstituted derivatives may include species substituted at the 1-H or 2-H position on the tetrazole ring or 1H- or 2H-tetrazoles substituted at position 5, i.e. the carbon ring atom. Disubstituted derivatives may include 1,5- or 2,5-disubstituted compounds. Monosubstituted and disubstituted derivatives may include alkyl, alkenyl, alkynyl or arylalkyl or aryl groups. The alkyl, alkenyl and alkynyl groups may be branched or unbranched, substituted or unsubstituted. In some embodiments, the mono- and disubstituted derivatives may include lower alkyl, lower aryl and arylalkyl groups. Lower alkyl and lower arylalkyl groups denote alkyl groups and alkyl moiety in arylalkyl groups having up to and including 4, carbon atoms. Lower alkyls may include, for example, methyl, ethyl, propyl, isopropyl, butyl, isobutyl, secondary butyl or tertiary butyl. Lower arylalkyl, may include, for example, benzyl. Aryl groups, for example, may include phenyl and phenyl substituted by up to and including 3 lower alkyl groups as defined above.

The aminotetrazoles may include, for example, 1-amino-1H-tetrazole, 2-amino-2H-tetrazole, 5-amino-1H-tetrazole and 5-amino-2H-tetrazole and their monosubstituted, disubstituted and trisubstituted derivatives. Mono-, di- and trisubstituted aminotetrazoles may include, for example, alkyl, alkenyl, alkynyl, arylalkyl or aryl groups. The alkyl, alkenyl and alkynyl groups may be branched or unbranched, substituted or unsubstituted. In some embodiments, the mono-, di- and trisubstituted aminotetrazoles may include lower alkyl, lower aryl and arylalkyl groups. Lower alkyl and lower arylalkyl groups denote alkyl groups and alkyl moiety in arylalkyl groups having up to and including 4 carbon atoms. Lower alkyls may include, for example, methyl, ethyl, propyl, isopropyl, butyl, isobutyl, secondary butyl or tertiary butyl. Lower arylalkyl, may include, for example, benzyl. Aryl groups, for example, may include phenyl and phenyl substituted by up to and including 3 lower alkyl groups as defined above. Monosubstituted aminotetrazoles may include species substituted at the tetrazole ring or compounds substituted at the amino group. The disubstituted aminotetrazoles may include compounds substituted at the tetrazole ring and amino group and compounds disubstituted at the amino group.

Salts of triazoles, aminotriazoles, tetrazoles and aminotetrazoles include inorganic salts, for example, ammonium, aluminium; alkali metal salts, for example, lithium, sodium or potassium; alkaline earth metal salts, for example, calcium or magnesium; and organic salts, for example, quaternary ammonium salts.

Some such compounds may not work in all embodiments, as determined by routine functional testing. The utility of such compounds may, for example, be routinely assayed in accordance with the guidance provided herein, including the Examples set out herein in which alternative nitrogen compounds may be substituted for routine test purposes.

In another aspect, the electrolyte may function as or further comprise a cathode depolariser reactant to suppress cathodic hydrogen generation. The cathode depolarizer may include, for example, isonicotinic acid and soluble salts thereof (alkali or ammonium for example), nitro-ethanol, nitromethane, nitroguanidine, nitrate salts and chlorate salts.

The invention also provides electrolytic cells incorporating an electrolyte comprising an active nitrogen compound selected from the group consisting of triazoles, aminotriazoles, tetrazoles, and aminotetrazoles wherein the active nitrogen compound is an anode reactant. In some embodiments, the electrolyte may also function as or comprise a cathode depolariser. The cathode depolariser may include, for example, isonicotinic acid and soluble salts thereof such as alkali or ammonium salts for example, nitro-ethanol, nitromethane, nitroguanidine, nitrate salts and chlorate salts.

The electrolytic cells may be associated with a fluid dispenser actuated by nitrogen gas produced at the anode by electrolysis of the active nitrogen compounds of the invention.

DETAILED DESCRIPTION OF THE INVENTION

Figure 1:
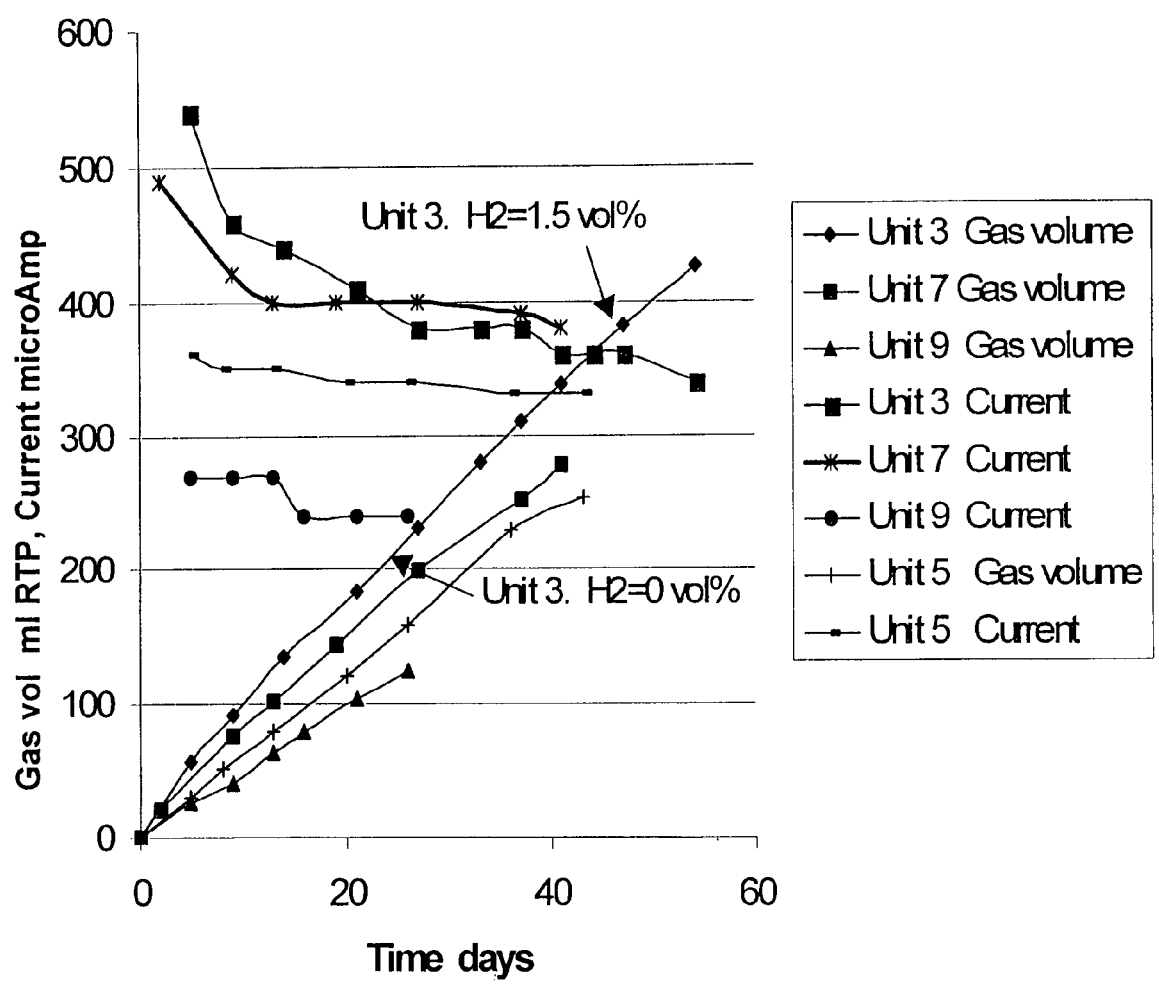
FIG. 1 is a graph showing plots of volume of gas and current generated as a function of time by electrolyte systems in PVC BUDGET-LUBER™ cells according to the present invention.

In one aspect, the present invention relates to the discovery that azole compounds having a high nitrogen content may be efficiently anodically oxidized to generate nitrogen gas. The generation of nitrogen by electrolysis of suitable triazoles, aminotriazoles, tetrazoles, aminotetrazoles and their respective salts may be particularly useful in electrochemical driven fluid dispensers. The electrolytes of the present invention may be used in fluid dispensers actuated by nitrogen gas produced electrochemically, such as fluid dispensers described for example in U.S. Pat. No. 6,299,743.

In accordance with one aspect of the present invention, an electric current is passed through an electrolyte comprising an active nitrogen compound selected from the group of triazoles, aminotriazoles, tetrazoles, aminotetrazoles, and their salts, the electrolyte being in contact with an anode. The electrolyte may be adapted to be sufficiently viscous or solid to operate in combination with a permeable cathode or anode to allow gas to be evolved from it, but to prevent loss of electrolyte. In some embodiments, it may be desirable to have a cathode with a high specific surface area (ie. porous or roughened) to give a low real current density on the cathode. A low cathode current density is generally desirable for use with a cathode depolariser as it improves the selectivity of electro-reduction of the cathode depolarizer over electro-reduction of water to hydrogen. The electrolyte may be sufficiently liquid to permit adequate mass transfer to provide for a desired rate of gas evolution. A variety of absorbent materials or gelling agents may be used to stabilise the electrolyte against leakage, including hydrophilic absorbent materials such as cellulose sponges, cotton wool, synthetic felts, diatomaceous earth; and gelling agents such as Carbopol, carboxymethylcellulose and others.

The electrolyte should have sufficient conductivity to conduct the electrolysis current. In some embodiments, the electrolyte may be provided by the active nitrogen compound dissolved in a suitable solvent or mixture of solvents. For example, 5-amino-tetrazole potassium salt is very soluble in water and is a suitable electrolyte for carrying the electrolytic generation of nitrogen gas. In other embodiments, a supporting electrolyte may be added to provide or enhance conductivity. A "supporting electrolyte" is defined herein as an electrolyte capable of carrying electric current but not discharging under electrolytic conditions. It is desirable in the present invention to select a supporting electrolyte that does not discharge substantially at the anode, since production of nitrogen occurs at the anode. In general, a supporting electrolyte is an ionic compound (salt, acid or base) capable of mediating electrical conductivity. Examples of suitable supporting electrolytes may include soluble halide, sulphate, nitrate, and chlorate salts and combinations thereof, having a cation selected from the group consisting of lithium, sodium, potassium, calcium, magnesium, ammonium, and aluminium or quaternary-ammonium salts.

In some embodiments, the supporting electrolyte may be selected to give electrolyte solutions with low freezing point, for example below −20° C. In other embodiments, the supporting electrolyte may be selected to work in a pH ranging from about 4 to about 10. In some embodiments, the supporting electrolyte may also function as a cathode depolarizer. For example, sodium nitrate may be used as both a supporting electrolyte and a cathode depolariser.

The supporting electrolyte may also provide antifreeze properties. In some embodiments, antifreeze properties may be associated with the use of inorganic supporting electrolytes such as sodium chloride, calcium chloride, sulphuric acid or ammonium sulphate. An organic antifreeze agent may also be added to the electrolyte to depress its freezing point. In some embodiments, examples of organic antifreezes may include acetone, glycerol, ethylene glycol, dimethyl sulphoxide, methanol, ethanol or urea. In some embodiments, the organic anti-freeze agent may also act as a co-solvent. For example DMSO may be used as both an antifreeze and co-solvent for 5-amino-1H-tetrazole in an aqueous electrolyte solution where the electrolyte is the potassium salt of 5-amino-tetrazole.

Suitable electrolyte solvents may be polar solvents capable of dissolving salts such as potassium 5-aminotetrazole for example, or organic solvents which dissolve the non-ionic organic reactants such as the 5-amino-1H-tetrazole for example. In some embodiments, it may be desirable to select a solvent that provides sufficient reactant solubility, for example greater than 1M; has a reasonably low vapour pressure, for example lower than 10 kPa at 20° C.; gives solutions with low freezing point, for example below −20° C.; is stable against electro-oxidation at the anode; and is stable against electro-reduction to undesirable products which may foul the cathode or be oxidised at the anode in preference to the anode reactant. In other embodiments, the solvent or mixture of solvents may be used to function as a non-aqueous electrolyte.

In some embodiments, a co-solvent may be added to dissolve the active nitrogen compound in circumstances where only the supporting electrolyte is compatible with the solvent chosen to carry out the electrolytic process. An organic solvent may be used as a co-solvent to bring non-ionic reactants into solution, with a polar solvent supporting the electrolyte. For example, 5-amino-1H-tetralzole has a low solubility in water (inferior to 1% in weight) and does not provide electrical conductivity. In order to produce nitrogen gas by electrolysis in water of 5-amino-1H-tetralzole, dimethylsulfoxide (DMSO) may be added as a co-solvent and sodium nitrate may be added as a supporting electrolyte. In some embodiments, the co-solvent may also be a cathode reactant but it is preferable that the co-solvent not be an anode reactant.

The electrolytes of the present invention may be used in a variety of conventional electrolysis cells, of either the one-compartment (undivided cell) or two-compartment (divided cell) type. Such cells comprise a container capable of resisting action of electrolytes, and an anode and cathode of electronically conductive materials, which are connected to a source of electric current. A divided electrolysis cell is one, which contains a separator that partitions the electrolyte solution to form separate anode and cathode chambers. The separator is in general a mechanical barrier, which is relatively inert to the electrolyte, for example, a porous diaphragm such as glass-frit or an ion-exchange membrane such as a NAFION™-type membrane. The anode and cathode chambers communicate through electrolyte in the pores of the separator, which allows ion transfer but suppresses electrolyte convection. In some embodiments, an undivided cell may preferably be employed.

Suitable materials for the anode and the cathode may include graphite cloth, graphite felt, graphite paper, GRAFOIL™ (graphite sheet), polymer impregnated graphite fibre and/or particles, stainless steel, nickel, DSA (noble metal oxide coated titanium) and platinised titanium. In some embodiments, it may not be necessary for the cathode to be relatively inert.

When undivided electrolysis cells are employed, additives may be used in the electrolyte to facilitate the generation of nitrogen at the anode while suppressing the co-generation of hydrogen on the cathode. A typical cathode reaction in an undivided cell is the generation of hydrogen by electro-reduction of water:

$$2H_2O + 2e^- \rightarrow H_2 + 2OH^- \qquad \text{reaction 2}$$

Hydrogen is however an undesirable product in some devices, such as certain lubricant dispensers, for the reasons discussed in the background section herein. It may accordingly be useful to use additives in an electrolyte that will react preferentially at the cathode to suppress the evolution of hydrogen, such compounds are termed herein "cathode depolarisers". In some embodiments, preferred cathode depolarisers will not be reduced to products that suppress the evolution of nitrogen at the anode.

In various embodiments, the invention provides a variety of alternative cathode depolarisers, such as isonicotinic acid and its soluble salts (for example, ammonium, potassium, sodium); nitroguanidine, nitro-ethanol, nitromethane, soluble nitrate salts such as ammonium nitrate, lithium nitrate, sodium nitrate, potassium nitrate, and calcium nitrate; soluble chlorate salts such as sodium chlorate, and potassium chlorate; and ketones such as acetone. The performance of candidate cathode depolarisers may be determined empirically in the context of a particular electrolytic cell. Preferred depolarisers may be obtained where the electro-reduction at the cathode is substantially irreversible. Some depolarisers may not work well under some conditions, such as a low temperature (for example below −25° C.).

In some embodiments, the electrolyte may also include one or more promoters. The promoter may be a catalyst that increases the rate and/or selectivity of electro-oxidation of the active nitrogen compound while possibly also decreasing the voltage required to drive the cell at a given current density. In some embodiments, examples of catalysts may include potassium fluoride, sodium chloride, sodium bromide, silver nitrate or a complexed transition metal ion. In some embodiments, a wetting agent such as sodium lauryl sulphate, sodium sulphosuccinate, or any suitable quaternary ammonium salt may be used as a promoter to improve contact or penetration of the electrolyte with the electrode(s). In other embodiments, the promoter may be a pH buffer such as boric acid, or potassium dihydrogen phosphate that holds the electrolyte pH within a given range while the cell is discharged.

The invention is further illustrated by, but is not limited to, the following examples.

EXAMPLE 1

This example relates to single electrode tests performed at an anode placed in one arm of a two-compartment H-type electrolysis cell. Table 1 shows the rate of gas generated at the anode under standard conditions for various electrolyte solution/anode material systems. About 100 ml of the specified electrolyte solution is placed in one arm of a glass H-cell and subject to anodic oxidation at 0.2 Ampere on a 12 cm² anode of the specified anode material. Calibration of the gas measuring system is carried out by electrolysis of an aqueous solution of potassium carbonate (first row in Table 1).

TABLE 1

Single Electrode Tests in an H-Cell.
Gas Generation at the ANODE

| Electrolyte solution | Anode material | Gas generation ml STP/min | Gas generation mole/Faraday |
|---|---|---|---|
| Water + 5 wt % $K_2CO_3$ | Nylon™ impregnated graphite fibre. ATS standard. | 0.50 | 0.18 |
| Water + 10 wt % $KCH_2N_5{}^a$ | Nylon™ impregnated graphite fibre ATS standard. | 2.5 | 0.90 |
| Water + 10 wt % $KCH_2N_5{}^a$ | $DSA^b$ | 2.0 | 0.73 |
| Water + 10 wt % $KCH_2N_5{}^a$ | 20 mesh nickel | 2.2 | 0.80 |
| Water + 10 wt % $KCH_2N_5{}^a$ | 10 mesh stainless steel | 1.9 | 0.68 |
| Water + 10 wt % $KCH_2N_5{}^a$ | Platinised titanium | 1.9 | 0.70 |
| Water + 10 wt % $KCH_2N_5{}^a$ 1 wt % KBr (catalyst) | Anode. Platinised titanium | 2.1 | 0.77 |

[a] $KCH_2N_5$ is 5-amino-tetrazole potassium salt (MW = 123).
[b] DSA = noble metal oxide coated titanium When potassium carbonate solutions are electrolysed the anode gas is only oxygen from the oxidation of water. Table 1 shows that nitrogen gas can be generated with a stoichiometry efficiency above 0.5 mol/F by anodic oxidation of potassium 5-amino-tetrazole in aqueous solution on electrodes of various materials. The presence of a nitrogen anode reactant suppresses the oxidation of water to oxygen, but may not eliminate it. The effectiveness of an active nitrogen anode reactant at preventing the co-generation of oxygen may depend on factors such as its nature, its concentration, the current density, electrode composition and temperature.

EXAMPLE 2

This example relates to single tests at the cathode performed in a two-compartment H-type electrolysis cell. Table 2 shows the rate of gas generated at the cathode under standard conditions for various electrolyte solution/cathode material systems. The electrolyte solutions all contain potassium 5-amino-tetrazole and a cathode depolariser. About 100 ml of the specified electrolyte solution is placed in one arm of a glass H-cell and subject to anodic oxidation at 0.2 Ampere on a 12 cm² anode of the specified anode material.

TABLE 2

Single Electrode Tests in an H-Cell.
Gas Generation at the CATHODE

| Electrolyte solution | Cathode material | Gas generation ml STP/min | Gas generation mole/Faraday |
|---|---|---|---|
| Water + 3 wt % KCH$_2$N$_5$[a] 0.5 M strontium nitrate | Graphite felt | 0.03 | 0.01 |
| Water + 10 wt % KCH$_2$N$_5$[a] 1.3% nitromethane | Graphite felt | 0.12 | 0.04 |
| Water + 10 wt % KCH$_2$N$_5$[a] 2% nitromethane | Graphite felt | 0.12 | 0.04 |
| Water + 10 wt % KCH$_2$N$_5$[a]] 7% acetone | Nylon™ impregnated Graphite fibre ATS standard | .031 | 0.11 |
| Water + 10 wt % KCH$_2$N$_5$[a] 1.5% nitroguanidine | Graphite cloth | 0.04 | 0.01 |
| Water + 10 wt % KCH$_2$N$_5$[a] 3.3% sodium chlorate | Graphite cloth (coppered) | 0.79 | 0.28 |

[a] KCH$_2$N$_5$ is 5-amino-tetrazole potassium salt (MW = 123)

Table 2 shows that cathodic reduction of aqueous solutions of potassium 5-amino-tetrazole containing a cathode depolariser gives rise to stoichiometric efficiency less than 0.5 mol/F. This result indicates that hydrogen generation is suppressed in these systems.

EXAMPLE 3

This example relates to combined tests to simulate processes in the undivided cell of a commercial lubricator. An Anode of GRAFOIL™ graphite sheet and a cathode of graphite cloth are placed with about 100 ml of the electrolyte solution specified in Table 3 in one arm of an H-type electrolysis cell. The specified electrolyte solution is subject to simultaneous anodic oxidation and cathodic reduction at 0.2 Ampere on 12 cm$^2$ electrodes of electrode material specified in Table 3.

TABLE 3

Electrodes Combined in one arm of an H-Cell.
Gas Generation in an Undivided Cell

| Electrolyte solution | Electrode materials | Gas generation (total) ml STP/min | Gas generation (total) mole/Faraday |
|---|---|---|---|
| Water[e] 10 wt % KCH$_2$N$_5$[a] 0.5 M potassium nitrate[c] | Anode = GRAFOIL™ Cathode = graphite cloth [Gas. Cathode <10% anode] | 2.0 | 0.72 |
| Water[e] 10 wt % KCH$_2$N$_5$[a] 0.5 M potassium nitrate[c] 10% acetone[d] | Anode = GRAFOIL™ Cathode = graphite cloth [Gas. Cathode <10% anode] | 2.8 | 0.99 |
| Water[e] 10 wt % KCH$_2$N$_5$[a] 3% nitromethane[c] 10% acetone[d] | Anode = GRAFOIL™ Cathode = graphite cloth [Gas. Cathode = zero] | 2.0 | 0.70 |
| Water[e] 10 wt % KCH$_2$N$_5$[a] 3% isonicotinic acid[c] | Anode = GRAFOIL™ Cathode = graphite cloth [Gas. Cathode <1% anode] | 2.6 | 0.91 |
| Water[e] 10 wt % KCH$_2$N$_5$[a] 3% isonicotinic acid[c] 17% glycerol[d] | Anode = GRAFOIL™ Cathode = graphite cloth [Gas. Cathode <1% anode] | 2.6 | 0.91 |
| Water[e] 6 wt % CH$_3$N$_5$[b] 6% isonicotinic acid[c] 28% glycerol[d,e] 6% sodium chloride[f] | Anode = GRAFOIL™ Cathode = graphite cloth [Gas. Cathode <10% anode] | 2.7 | 0.97 |
| Water[e] 6 wt % CH$_3$N$_5$[b]] 6% sodium nitrate[c,f] 28% DMSO[d,e] | Anode = GRAFOIL™ Cathode = graphite cloth Gas comp. H$_2$ = 5, N$_2$ = 95 vol % | 3.6 | 1.29 |

TABLE 3-continued

Electrodes Combined in one arm of an H-Cell.
Gas Generation in an Undivided Cell

| Electrolyte solution | Electrode materials | Gas generation (total) | |
|---|---|---|---|
| | | ml STP/min | mole/Faraday |
| Water[e] 6 wt % $CH_3N_5$[b] 6% nitromethane[c] 50% ethylene glycol[d,e] | Anode = GRAFOIL ™ Cathode = graphite cloth [Gas. Cathode = zero] | 2.5 | 0.89 |

[a] 5-amino-tetrazole potassium salt (MW = 123).
[b] 5-amino-1H-tetrazole (MW = 85).
[c] cathode depolariser.
[d] antifreeze agent.
[e] solvent.
[f] supporting electrolyte Table 3 shows that combinations of potassium 5-aminotetrazole or 5-amino-1H-tetrazole with various cathode depolarisers, and addition of solvents and antifreeze agents can be electrolysed together in an undivided cell to generate gas with a stochiometric efficiency above 0.5 mol/F. Visual observation of both electrodes showed the rate of gas evolution from the cathode (hydrogen) ranged from zero up to about 10% of the gas rate from the anode (nitrogen).

The probable (but unknown) amino-tetrazole anode reaction is:

$$CH_3N_5 + 2H_2O \rightarrow 2N_2 + HCOOH + NH_4^+ + H^+ + 2e^- \quad \text{reaction 5}$$

Table 3 shows that some electrolytic systems give rise to a stoichiometric efficiency of gas generation near the value of 1 expected in reaction 5.

EXAMPLE 4

This example illustrates six different combinations of electrodes and electrolyte composition, which generate nitrogen under conditions similar to those of a commercial lubricant dispenser. About 25 ml of an electrolyte solution specified in Table 4 (unit 3, 5, 7, 9, 21 or 35) is absorbed into a cellulose sponge contained between two electrodes of an ATS Electro-Luber BUDGET-LUBER™ sized sealed PVC test cell (ca. 6 cm diameter electrodes). The cell was connected in series with two 1.6 Volt batteries, a resistor and a switch. The current and volume of gas generated were monitored over a period of several weeks' operation at room temperature.

TABLE 4

Gas Generation in a sealed PVC test cell

| Electrolyte solution | Electrode materials | Current | Gas generation | |
|---|---|---|---|---|
| | | microA | ml STP/h | mole/Faraday |
| Unit 3. Water[e] 16 wt % .$KCH_2N_5$[a] 8 wt % isonicotinic acid[c] 20 wt % DMSO[d] 0.5 wt % boric acid | Anode = GRAFOIL ™ Cathode = graphite cloth | 401 | 0.31 | 0.87 |
| Unit 5. Water[e] 16 wt % $KCH_2N_5$[a] 8 wt % sodium nitrate[c] 20 wt % DMSO[d] | Anode = GRAFOIL ™ Cathode = graphite cloth | 343 | 0.23 | 0.75 |
| Unit 7. Water[e] 6 wt % $CH_3N_5$[b] 6 wt % calcium nitrate[f,c] 50 wt % DMSO[e,d] | Anode* = Nylon ™ impregnated Graphite fibre Cathode* = Nylon ™ impregnated Graphite fibre | 411 | 0.28 | 0.77 |
| Unit 9. Water[e] 10 wt % $CH_3N_5$[b] 6 wt % sodium nitrate[f,c] 50 wt % DMSO[e,d] | Anode* = Nylon ™ impregnated Graphite fibre Cathode* = Nylon ™ impregnated Graphite fibre | 355 | 0.19 | 0.85 |
| Unit 21. Water[e] 10 wt % $KCH_2N_5$[a] 10 wt % $CH_3N_5$[b] | Anode = GRAFOIL ™ Cathode = Graphite Cloth | 475 | 0.38 | 0.98 |

TABLE 4-continued

Gas Generation in a sealed PVC test cell

| Electrolyte solution | Electrode materials | Current microA | Gas generation ml STP/h | mole/Faraday |
|---|---|---|---|---|
| 8 wt % isonicotinic acid[c] 6 wt % lithium nitrate[f,e] 40 wt % DMSO[e,d] | | | | |
| Unit 35 Water[e] 26 wt % $KCH_2N_5$[a] 10 wt % isonicotinic acid[c] 40 wt % DMSO[d] | Anode = GRAFOIL™ Cathode = Graphite Cloth | 528 | 0.46 | 1.03 |

[a] 5-amino-tetrazole potassium salt (MW = 123).
[b] 5-amino-1H-tetrazole (MW = 85).
[c] cathode depolariser.
[d] antifreeze agent.
[e] solvent.
[f] supporting electrolyte.
*Standard A.T.S. Electro-Lube, BUDGET-LUBER™ electrodes.

Unit 3, 5 and 35 use 5-amino-tetrazole potassium salt as anode reactant, with GRAFOIL™ (anode) and graphite cloth (cathode) electrodes and test the effect of cathode depolariser (i.e. isonicotinic acid and sodium nitrate). The results of these two unit runs show that potassium 5-aminotetrazole is a useful anode reactant for generating nitrogen gas, since the stoichiometric efficiency for nitrogen gas ranges from 0.75 to 0.85 mole of nitrogen gas per Faraday, compared to the value of 1 mole/F predicted by reaction 5. Both isonicotinic acid and sodium nitrate are effective cathode depolarisers since the hydrogen content of the gas produced in these units by reaction 2 was nearly nil in the first few days of each run and below 5% at later stages of the runs. For both units, the relatively high stoichiometric efficiency indicates that secondary anode reactions, such as oxygen generation (reaction 1), and oxidation of cathode reaction products (which in an undivided cell would transport to the anode) are occurring at tolerably low rates. The loss of nitrogen gas efficiency due to secondary reactions is a major potential problem in practical systems, a problem that usually increases over time, as the anode reactant is depleted and the cathode reaction products accumulate in the cell.

Units 7 and 9 use 5-amino-1H-tetrazole as anode reactant and standard commercial ATS electrodes consisting of Nylon™ impregnated with graphite fibres. A greater amount of DMSO is required than in units 3 and 5 due to the much lesser solubility of the aminotretrazole. One advantage of using DMSO is that it provides antifreeze properties as well. The presence of nitrate salts in units 7 and 9 provides the electrical conductivity necessary to conduct the electrolysis current. The standard ATS electrodes and current densities used in Unit 7 and 9 runs allow the nitrate salts to act as cathode depolarisers by reduction of $NO_3^-$.

Unit 21 uses a mixture of 5-amino-tetrazole potassium salt and 5-amino-1H-tetrazole as anode reactant with GRAFOIL™ (anode) and graphite cloth (cathode) electrodes. The results of this unit show that mixtures of high nitrogen content azole derivatives also provide useful anode reactants for generating nitrogen gas.

EXAMPLE 5

This example gives the gas composition for different combinations of electrodes and electrolyte systems operating under the same experimental conditions than those described in Example 4. Gas samples were collected for each unit after one month of functioning at room temperature and analysed with a M100 gas chromatograph from MTI Analytical Instruments (Freemont, Calif.) calibrated with a gas composed by volume of 80% nitrogen, 2% oxygen, 8% hydrogen, 5% methane and 5% carbon monoxide. The gas compositions reported in Table 5 are normalised except for cases where the sum of the unnormalised values is less than 100% as this may indicate the presence of gases unidentifiable by the instrument.

TABLE 5

Gas composition for different Electrodes/Electrolyte systems in a sealed PVC test cell.

| Electrolyte solution | Electrode materials | Gas composition [vol. %] |
|---|---|---|
| Unit 21 Water[e] 10 wt % $KCH_2N_5$[a] 10 wt % $CH_3NH_5$[b] 8 wt % isonicotinic acid[c] 6 wt % lithium nitrate[f,e] 40 wt % DMSO[d,e] | Anode = GRAFOIL™ Cathode = Carbon Cloth | $H_2$: 0 $O_2$: 5.2 $N_2$: 94.7 $CH_4$: 0.12 CO: 0.004 |
| Unit 35 Water[e] 26 wt % $KCH_2N_5$[a] 10 wt % isonicotinic acid[c] 40 Wt % DMSO[d] | Anode = GRAFOIL™ Cathode = Carbon Cloth | $H_2$: 0.08 $O_2$: 6.7 $N_2$: 93.2 $CH_4$: 0.02 CO: 0.012 |
| Unit 9 Water[e] 10 wt % $CH_3NH_5$[b] 10 wt % sodium nitrate[f,e] 50 wt % DMSO[d,e] | Anode = GRAFOIL™ Cathode = Carbon Cloth | $H_2$: 9.5 $O_2$: 5.4 $N_2$: 80 $CH_4$: 0.19 CO: 0.006 |
| Unit 11 Water[e] | Anode = GRAFOIL™ Cathode = Carbon Cloth | $H_2$: 0.8 $O_2$: 3 |

TABLE 5-continued

Gas composition for different Electrodes/
Electrolyte systems in a sealed PVC test cell.

| Electrolyte solution | Electrode materials | Gas composition [vol. %] |
|---|---|---|
| 20 wt % $KCH_2N_5$[a] 5 wt % isonicotinic acid[c] 0.5 wt % Boric Acid 13 wt % DMSO[d,e] Unit 13 Water[e] 10 wt % $CH_3NH_5$[b] 8 wt % lithium nitrate[f,c] 50 wt % DMSO[d,e] | Anode = ATS Cathode = ATS | $N_2$: 90.5 $CH_4$: 0.2 CO: 0 $H_2$: 0 $O_2$: 5.6 $N_2$: 94 $CH_4$: 0.34 CO: 0.02 |
| Unit 16 Water[e] 16 wt % $KCH_2N_5$[a] 5 wt % isonicotinic acid[c] 5 wt % sodium nitrate[c] 10 wt % Ethylene Glycol[d] 20 wt % DMSO[d] | Anode = GRAFOIL ™ Cathode = Carbon Cloth | $H_2$: 9.5 $O_2$: 8.5 $N_2$: 81 $CH_4$: 0.017 CO: 0.008 |

[a]5-amino-tetrazole potassium salt (MW = 123).
[b]5-amino-1H-tetrazole (MW = 85).
[c]cathode depolariser.
[d]antifreeze agent.
[e]solvent.
[f]supporting electrolyte.

FIG. 1 shows the gas volumes and currents measured in Unit 3, 5, 7, and 9 runs. FIG. 1 also shows that generation of hydrogen gas after 27 and 47 days operation of Unit 3 remains low, the remainder of the gas measured being only nitrogen. The range of rates of gas generation corresponds to differences in both the current efficiencies and the effective internal cell resistance, which sets the cell current. The effective cell resistance depends on several factors, such as the electrolyte conductivity and the kinetics of the electrode reactions and these factors are all varied in the set of Units 3, 5, 7, and 9. The linearity of gas generation and relative constancy of each of the currents with time show that the anode reaction efficiency is not much reduced by secondary reactions arising from accumulation of cathode reaction products. A constant gas generation rate is important for commercial applications such as lubricant dispenser, where a constant rate of grease delivery is nearly always required.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Numeric ranges are inclusive of the numbers defining the range. In the specification, the word "comprising" is used as an open-ended term, substantially equivalent to the phrase "including, but not limited to", and the word "comprises" has a corresponding meaning. Citation of references herein shall not be construed as an admission that such references are prior art to the present invention. All publications, including but not limited to patents and patent applications, cited in this specification are incorporated herein by reference as if each individual publication were specifically and individually indicated to be incorporated by reference herein and as though fully set forth herein. The invention includes all embodiments and variations substantially as hereinbefore described and with reference to the examples and drawings.

What is claimed is:

1. A method for producing by electrolysis nitrogen gas comprising passing a current through an electrolyte, said electrolyte comprising an active nitrogen compound selected from the group consisting of triazoles, aminotriazoles, tetrazoles, aminotetrazoles and salts thereof, said active nitrogen compound being an anode reactant.

2. The method of claim 1, wherein said electrolyte further comprises a cathode depolariser reactant to suppress hydrogen gas formation.

3. The method of claim 2, wherein the cathode depolariser is selected from the group consisting of isonicotinic acid and soluble salts thereof, nitro-ethanol, nitromethane, nitroguanidine, nitrate salts and chlorate salts.

4. The method of claim 3, wherein the cathode depolariser is nitro-ethanol, nitromethane, isonicotinic acid, a nitrate salt or a chlorate salt.

5. The method of claim 1, wherein the electrolyte is an ionic compound selected from the group consisting of 5-amino-tetrazole potassium, nitrate salts, chlorate salts, and chloride salts.

6. The method of claim 1, wherein the electrolyte further comprises a co-solvent.

7. The method of claim 6 wherein the co-solvent is selected from the group consisting of acetone, or dimethylsulphoxide, glycerol, ethylene glycol, methanol and ethanol.

8. The method of claim 6, wherein the electrolyte comprises a supporting electrolyte.

9. The method of claim 8, wherein the supporting electrolyte is a nitrate salt, a chlorate salt or a chloride salt.

10. The method of claim 1, wherein the electrolyte further comprises an antifreeze agent.

11. The method of claim 10, wherein the antifreeze agent is selected from the group consisting of acetone, glycerol, DMSO, and ethylene glycol.

12. The method of claim 1, wherein the active nitrogen compound is 5-amino-1H-tetrazole.

13. The method of claim 12, wherein the electrolyte is aqueous and further comprises a co-solvent and a supporting electrolyte.

14. The method of claim 13 wherein the co-solvent is glycerol, ethylene glycol or DMSO and the supporting electrolyte is a chloride or nitrate salt.

15. The method of claim 1, wherein the active nitrogen compound is an aminotetrazole salt.

16. The method of claim 15, further comprising a cathode depolariser.

17. The method of claim 16, wherein the cathode depolariser is isonicotinic acid or nitrate salt.

18. A method for producing by electrolysis nitrogen gas, comprising passing a current through an electrolytic cell, said electrolytic cell comprising:
   (a) an anode;
   (b) a cathode; and
   (c) an electrolyte comprising an active nitrogen compound selected from the group consisting of triazoles, aminotriazoles, tetrazoles, aminotetrazoles and salts thereof, said active nitrogen compound being an anode reactant.

19. The method of claim 18, wherein the active nitrogen compound is an aminotetrazole or an aminotetrazole salt.

20. The method of claim 19, wherein the electrolyte cell further comprises a cathode depolariser to suppress hydrogen formation at the cathode.

21. The method of claim 20, wherein the cathode depolariser is nitro-ethanol, nitromethane, isonicotinic acid, a nitrate salt or a chlorate salt.

22. The method of claim 20, wherein the electrolyte further comprises a co-solvent.

23. The method of claim 20 wherein the electrolyte further comprises an antifreeze agent.

24. The method of claim 23, wherein the antifreeze agent is acetone, glycerol, ethylene glycol, or DMSO.

25. The method of claim 20, wherein the aminotetrazole is 5-amino-1H-tetrazole.

26. The method of claim 25, wherein the cathode depolariser is an alkali or alkaline earth nitrate salt and the co-solvent is DMSO.

27. The method of claim 26, wherein the anode and the cathode are polymer impregnated graphite.

28. The method of claim 20, wherein the aminotetrazole salt is potassium 5-amino-tetrazole.

29. The method of claim 28, wherein the anode is GRAFOIL™ and the cathode is graphite cloth.

30. The method of claim 29, wherein the cathode depolariser is isonicotinic acid or an alkali or ammonium salt thereof, or an alkali or alkaline earth nitrate salt.

31. The method of claim 30 wherein the electrolyte further comprises an antifreeze agent.

32. The method of claim 18, wherein the anode and the cathode comprise a polymer impregnated graphite, GRAFOIL™, graphite paper, graphite felt or graphite cloth.

33. The method of claim 18, wherein the anode is GRAFOIL™, the cathode is graphite cloth, and the electrolyte is an aqueous solution comprising 10% by weight of potassium 5-amino-tetrazole, 10% by weight of 5-amino-1H-tetrazole, 8% by weight of isonicotinic acid, 6% by weight of lithium nitrate and 40% by weight of dimethylsulphoxide.

34. The method of claim 18, wherein the anode and cathode are Nylon™ impregnated graphite, and the electrolyte is an aqueous solution comprising 26% by weight of potassium 5-amino-tetrazole, 10% by weight of isonicotic acid and 40% by weight of dimethylsulphoxide.

35. The method of claim 18, further comprising a transducer for capturing the nitrogen gas generated at the anode and producing mechanical energy therefrom.

36. The method of claim 35, wherein the transducer is mechanically coupled to a fluid dispenser so that a fluid is dispensed from the fluid dispenser when nitrogen gas is generated at the anode.

* * * * *